United States Patent
Sullivan et al.

(10) Patent No.: US 7,975,764 B2
(45) Date of Patent: *Jul. 12, 2011

(54) EMULSION SYSTEM FOR SAND CONSOLIDATION

(75) Inventors: Philip F. Sullivan, Bellaire, TX (US); Erik Nelson, Houston, TX (US); Juan-Carlos Gonzalez, Houston, TX (US); Samuel Danican, Aberdeen (GB); Gary Tustin, Sawston Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 351 days.

This patent is subject to a terminal disclaimer.

(21) Appl. No.: 11/861,894

(22) Filed: Sep. 26, 2007

(65) Prior Publication Data

US 2009/0078417 A1  Mar. 26, 2009

(51) Int. Cl.
*E21B 33/138* (2006.01)
*E21B 43/22* (2006.01)

(52) U.S. Cl. ......... 166/293; 155/276; 155/300; 507/269

(58) Field of Classification Search ........................ None
See application file for complete search history.

(56) References Cited

U.S. PATENT DOCUMENTS

| | | | |
|---|---|---|---|
| 4,291,766 A | 9/1981 | Davies | |
| 4,427,069 A | 1/1984 | Friedman | |
| 4,669,543 A | 6/1987 | Young | |
| 5,199,492 A | 4/1993 | Surles | |
| 5,805,593 A | 9/1998 | Busche | |
| 6,613,720 B1 | 9/2003 | Feraud | |
| 7,111,683 B2 | 9/2006 | Nelson | |
| 2003/0116065 A1* | 6/2003 | Griffith et al. | 106/705 |
| 2004/0147404 A1* | 7/2004 | Thaemlitz et al. | 507/100 |
| 2007/0021307 A1* | 1/2007 | Pomerleau | 507/204 |
| 2007/0102157 A1* | 5/2007 | Roddy et al. | 166/291 |

* cited by examiner

*Primary Examiner* — Zakiya Bates
(74) *Attorney, Agent, or Firm* — David G. Matthews; Rodney Warfford

(57) ABSTRACT

A sand consolidation system and a method for use of the system is provided. The consolidation system includes an emulsion having an oil phase and an aqueous phase, wherein the emulsion contains a source of insoluble silica particles and a source of calcium hydroxide, wherein the calcium hydroxide particles are present in the oil phase, and the insoluble silica particles are contained in the aqueous phase. Both types of particles must have average particle sizes which will fit into the pores of the formations.

27 Claims, No Drawings

EMULSION SYSTEM FOR SAND CONSOLIDATION

FIELD OF THE INVENTION

The invention relates to oilfield treatment fluids and methods for their use. Specifically, the invention relates to emulsions and their methods of use for sand consolidation.

BACKGROUND OF THE INVENTION

Hydrocarbon fluids, such as oil and natural gas, and other desirable formation fluids are obtained from a subterranean geologic formation, i.e., a reservoir, by drilling a well that penetrates the formation zone that contains the desired fluid Once a wellbore has been drilled, the well must be completed. A well "completion" involves the design, selection, and installation of equipment and materials in or around the wellbore for conveying, pumping, or controlling the production or injection of fluids. After the well has been completed, production of the formation fluids can begin.

When the subterranean formation is "soft" or poorly consolidated, small particulates (typically sand) present in the formation may dislodge and travel along with the produced fluid to the wellbore. Production of sand is highly undesirable since it erodes surface and subterranean equipment, and it must be removed from the produced fluids before they can be processed. In addition, the migrating sand can plug the flow channels in the formation and thereby necessitate other stimulation techniques, such as acid stimulation, to restore the well's performance.

Various methods have been employed to reduce or eliminate the concurrent production of sand and other particulates with the formation fluids. One common approach has been to filter the produced fluids through a gravel pack that has been placed into the wellbore Such gravel packs are often retained by a metal screen. The produced formation fluids travel through the permeable gravel pack (and the screen) before entering the wellbore. The sand and other particulates in the produced fluids are blocked by the gravel pack. This technique has been widely used in the past, but it has several disadvantages. With time, the gravel pack and the screen may be plugged by scale or particles, or badly eroded by the sand and other particulates in the produced fluids. This reduces the effectiveness of the gravel pack and screen and may actually shut down the production if the gravel pack and/or screen becomes plugged with sand or formation fines. In addition, the presence of the metal screen in the well inhibits reentry of drills and other tools into the wellbore and the metal screen can be difficult and costly to remove, which as led to the industry's development of so-called screenless completion techniques.

Many systems have been proposed for sand consolidation systems in oilfield applications but, to date, a completely satisfactory product has not been introduced and accepted by the industry. These techniques typically involve the injection of a consolidating fluid, such as a resin-based consolidating fluid, through the wellbore and into the formation surrounding the interval of interest. Resin-based consolidating fluids generally include an organic resin, a curing agent, a catalyst and an oil wetting agent. The resin system hardens in the formation, thereby consolidating it. Some systems chemicals are pumped in stages, creating a complicated treatment procedure. Most sand-consolidation techniques involve epoxy- or furan-based resins. Examples of such systems include those disclosed in U.S. Pat. Nos. 4,291,766, 4,427,069, 4,669,543, 5,199,492 and 5,805,593. When the individual components of the consolidating fluid are pumped as different stages into the formation they may or may not come together in the correct order, in the correct amounts, or they may not even come together at all. And, if they do come together, good mixing of the components is not assured Thus, there is no guarantee that after placement, the chemicals have been distributed evenly throughout the near-wellbore region. Because of the complexity and unreliability of these systems, single stage consolidation treatments have been long desired by the industry.

Thus far, single-stage consolidation systems have been directed toward screenless completions. Screenless completions involving formation consolidation were disclosed by Nelson et al. in U.S. Pat. No. 5,551,514. The concept in such systems was to consolidate the formation around perforations using a single-stage flexible gel system. Following the consolidation step, the formation permeability surrounding the treated interval is too low to allow the practical production of hydrocarbons. Therefore, the system required performing a fracturing/packing ("frac-pack") treatment using curable resin coated proppant, or conventional proppant containing fibers, through the sand pack After the frac pack, the proppant pack in the perforations would prevent the entry of gravel into the wellbore, and the sand surrounding the perforations would be consolidated and unable to enter the wellbore. This disclosure envisioned the use of conventional resins; however, subsequent systems have used other chemical approaches.

James et al. disclosed a using a gel component and a gel forming agent as a sand consolidation medium for screenless completions in U.S. Pat. No. 6,450,260. Danican et al. disclosed the use of colloidal silica for formation consolidation in U.S. Pat. No. 7,013,973. The James patent had a drawback in that the consolidated sand pack was so impermeable that there were doubts whether one could fracture through it. In addition, diversion was difficult. The colloidal silica system also had diversion difficulties; however, the main problem with these systems was an incompatibility with brines. Frequently, highly saline completion fluids are present in the wellbore during sand-consolidation treatments.

More recently, U.S. Pat. No. 7,111,683 discloses a sand consolidation system based on silica and calcium hydroxide to cement sand grains together in the near-wellbore region. Silica and calcium hydroxide react to form a cementitious calcium silicate gel. This process is commonly known as a "pozzolanic reaction." The greatest limitations of this technique involve separation of the chemical reagents from each other and from brines that are normally present in the wellbore. If the silica and calcium hydroxide contact each other before entering the sand pack, the reaction can begin prematurely in the wellbore. In addition, calcium hydroxide crystals tend to nucleate and grow, limiting their ability to penetrate the pores between sand grains. Also, if the silica component is deployed as colloidal silica, it will precipitate on contact with brine in the wellbore, thereby preventing sand consolidation.

Additionally, Feraud et al. (U.S. Pat. No. 6,613,720) discloses a wide range of controlled release techniques using emulsions. In this patent, the inventors disclosed controlled release of chemicals by stabilizing the active ingredients in the discontinuous phase of an emulsion, which is then destabilized by a number of different triggers.

It would be desirable to have a single-stage sand consolidation system and process for use in subterranean formations where the system contains stable ingredients and/or provides protection for the ingredients from each other and from brines, preventing undesirable crystal growth, precipitation or the like, which interfere with or even prevent sand consolidation.

It has now been discovered that an emulsion containing both silica and calcium hydroxide particles can be used as a single stage sand consolidation system without destabilization when the particles are isolated by placing them in different phases of the emulsion.

SUMMARY OF THE INVENTION

The invention provides a single-stage sand consolidation fluid comprising an emulsion containing silica particles and calcium hydroxide particles. Isolating the chemical reagents in an emulsion protects them from each other prior to insertion inside the formation, and from contact with completion fluids in the wellbore that would damage or prevent the consolidation process.

Specifically, the invention provides a sand consolidation system comprising an oil and water emulsion containing silica particles and calcium hydroxide particles wherein the calcium hydroxide particles are present in the oil phase, and the silica particles are contained in the aqueous phase.

In one embodiment, the invention provides a sand consolidation system comprising an emulsion having a external oil phase, and an internal aqueous phase wherein the silica particles are contained in the aqueous phase and the calcium hydroxide particles are contained in the oil phase.

The description and examples are presented solely for the purpose of illustrating the preferred embodiments of the invention and should not be construed as a limitation to the scope and applicability of the invention. While the compositions used in methods of the invention may be described herein as comprising certain materials, it should be understood that the composition could optionally comprise two or more chemically different materials. In addition, the composition can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

DETAILED DESCRIPTION OF THE INVENTION

The invention provides a single-stage sand consolidation system which is an emulsion. The emulsion has an aqueous phase, and an oil phase. The emulsion can be an oil-in-water emulsion or a water-in-oil emulsion. Useful ratios of oil to water include the range of from about 30/70 to about 60/40, including ratios therebetween such as 30/70; 40/60; 50/50, 60/40, and the like.

In one embodiment, the emulsion includes an aqueous phase that comprises about 5 vol % of a fatty acid ester in a colloidal silica sol. The oil phase comprises 5 vol % poly (isobutylene) ethanolamide and 15 wt % calcium hydroxide (preferred particle size: 1-11 µm) in diesel oil or fuel (hereinafter "diesel").

The concentration of the components in the aqueous system can be varied, but commonly a very low solids concentration is used. The stoichiometry of the pozzolanic reaction between the components is variable. Normally, a $CaO/SiO_2$ mole ratio of from about 0.8 to about 2.5 is used. A mole ratio of $CaO/SiO_2$ of from about 1 to about 2 is one useful example; and a mole ratio of from about 1.3 to about 1.5 of such materials is another useful example. The components may be blended "on-the-fly" using equipment on the surface to pump the emulsion into the wellbore, or may be prepared in advance of the treatment.

The silica source component in the aqueous system may be any of the known family of materials known as pozzolans, provided that the silica particle size is small enough to enter the pores of the region to be consolidated. A pozzolan is defined as a siliceous or siliceous and aluminous material, which in itself possesses little or no cementitious value but that will, in finely divided form and in the presence of moisture (i.e., water), chemically react with calcium hydroxide to form compounds (i.e., calcium silicate hydrate gels) that do possess cementitious properties. Pozzolans can be silica fume, fumed silica, precipitated silica, colloidal silica, calcined clay, fly ash, and the like However, colloidal silica, silica fume and fumed silica are preferred pozzolans, based on cost and availability. Colloidal silica systems are commercially available at concentrations of from about 15 to about 50 weight percent (wt. %) silica. Such silica systems can be used as such or diluted with water, if desired, to about 2 wt. % but concentrations of from about 25 to about 50 wt. % may be used to reduce the amount of fluid pumped into the formation in embodiments of the present invention. The colloidal silicas useful herein typically have particle sizes less than about 1 µm. The nominal particle diameter of silica fume or fumed silica ranges from about 9 to about 30 nm.

The source of calcium hydroxide may also be any known source material. The size of the is dependent on the type of sand in the formation, the size of the sand particles and the voids in the formation. In many, if not most, current commercial calcium hydroxides, the particles are too large to be useful. Calcium hydroxide particles/crystals should be small enough to enter the pores of the formation, generally no more than about 50 percent of the average pore size of the average void in the foundation, preferably no more than about 30 percent of the average pore size.

In one embodiment, therefore, the calcium hydroxide component is prepared by blending a soluble calcium salt (e.g., calcium chloride or calcium chloride hydrate) with an aqueous inorganic base (e.g., aqueous sodium hydroxide) to form calcium hydroxide in situ within the wellbore as the system is being pumped and/or within the pores of the formation Aqueous solutions of the calcium salt (e.g., calcium chloride) are used at concentrations of from about 1 to about 50 weight percent (wt. %), and preferably from about 20 to about 50 wt. %. Aqueous solutions of the inorganic base (e.g., sodium hydroxide) may be used in embodiments of the invention at concentrations of from about 1 to about 50 weight percent (wt. %), and in some embodiments from about 20 to about 50 wt. % may be used. In embodiments in which the higher concentrations are used, less fluid is pumped into the formation.

In the method of using the emulsion consolidation system, the emulsion (which may also be referred to as a consolidation fluid) is generally pumped into the unconsolidated or loosely consolidated formation through one or more perforations in the casing of a cased hole, but it may also be used in an open hole. The emulsion is mixed and pumped into position at a pressure below the formation fracturing pressure. The emulsion penetrates and fills the pores of the formation in the treated interval When we say that the pores are filled, we mean that they are filled at least sufficiently filled that the reaction causes a satisfactory consolidation of the formation. The emulsion will break over a period of time in the formation, either through exposure to elevated temperatures, exposure to sand or both. As the emulsion breaks, the colloidal silica and calcium hydroxide contact each other and react to form a calcium silicate hydrate gel, and the sand-consolidation process begins. The unconsolidated sand and other formation fines in contact with the emulsion are thereby incorporated into and/or bonded to the gel. The formation is consolidated when the calcium silicate hydrate gel hardens.

The volume of consolidation emulsion to be injected into the formation is primarily a function of the formation pore volume to be treated. The formation pore volume can be determined by one of ordinary skill in the art using known laboratory techniques. The volume of consolidation fluid obviously relates to the height of the zone to be treated, the formation-rock porosity and the depth of penetration into the formation that is desired (the volume will increase in each instance). In some embodiments, the depth of penetration will be at least about one foot (about 30 cm) radially from the wellbore into the formation. The ability of the consolidating fluid to penetrate the formation depends on the permeability of the formation and the viscosity of the consolidation fluid. If the permeability of the formation is high and/or the viscosity of the consolidation fluid is low, then the ability of the consolidation fluid to penetrate the formation is enhanced The ability of the consolidation fluid to penetrate the formation is also enhanced at higher pump pressures, so long as the pressure used is below the fracturing pressure.

One of the advantages of embodiments of the present invention is that the operator does not have to use a pretreatment or a pre-flush to make the formation oil-wet before injecting the pumpable aqueous system into the wellbore. However, the operator may find it advantageous to circulate an aqueous system containing a minor amount of a clay stabilizer (e.g., tetraalkylammonium halides) through the well to remove contaminants in the well before injecting the consolidation fluid of the present invention. The portion, if any, of such aqueous systems remaining in the wellbore will be injected into the formation during the practice of the invention and can assist in stabilizing clays in the formation and thereby reduce formation damage. A post-flush with such an aqueous medium may also be beneficial to clear the wellbore of the reactive silicon and calcium hydroxide components. This is particularly true of a new well. However, one should be careful not to inject the post-flush into the formation because this would sweep the cementitious material away from the near-wellbore region. If the process is being used as a remedial treatment of an older well, however, the operator may wish to leave the wellbore at least partially filled with the reactive components and let the calcium silicate hydrate gel form in the wellbore (in addition to the interval surrounding the wellbore). The operator can then drill through the gel plug that forms in the wellbore and re-perforate the casing. In this manner, old perforations are plugged with the gel and cementitious material, which acts as a diverter, and hydraulic fracturing can be done through the new perforations in the interval (s) of interest. Various phased perforation techniques and/or fracturing techniques can be beneficially applied to stimulate the production of formation fluids by fracturing through the consolidated formation, and proppant packs containing fibers or resin-coated materials such as proppant and/or fibers can also be beneficially used in the stimulation treatment. An exemplary proppant-retention agent is a fiber commercially available from Schlumberger under the tradename Prop-NET™. The proppant-retention agent keeps the proppant in the fracture, and the proppant and proppant-retention agent keep formation particles from being produced concurrently with the formation fluids. The proppant size must also be properly selected to exclude the formation sand, according to Saucier's criteria. This fracturing technique is illustrated, for example, in U.S. Pat. No. 6,450,260, the disclosure of which is incorporated herein by reference.

The emulsions of the invention are readily prepared by agitating the mixtures for several minutes in a paddle mixer, pumped into an unconsolidated sand pack and allowed to cure for up to 24 hours at the bottomhole temperature. The required compressive strength of the consolidated sand pack depends on the geomechanical nature of the formation.

The following examples are presented to illustrate the preparation and properties of compositions and methods of the invention, and should not be construed to limit the scope of the invention, unless otherwise expressly indicated in the appended claims. All percentages, concentrations, ratios, parts, etc. are by weight unless otherwise noted or apparent from the context of their use.

The examples demonstrate sand consolidation from an emulsion containing both colloidal silica and calcium hydroxide powder. Ideally, these components are combined in a molar lime-to-silica [$CaO/SiO_2$) ratio between 0.8 and 2.5.

EXAMPLE 1

In the first example, 5 vol % of a surfactant, Uniquema Hypermer™ 2422 [poly(isobutylene) ethanolamide], was added to diesel. The surfactant readily dispersed and dissolved. Then, calcium hydroxide powder (Aldrich Product Number 239232 with a mean particle size of 11 μm) was dispersed into 5 milliliters (mL) of the diesel solution at a concentration of 1.0 g/100 mL.

A combination of colloidal silica and surfactant was prepared in a separate container. 5 mL of colloidal silica suspension (LUDOX™ HS-40) was combined with 5 vol % of another surfactant, Baker Petrolite® A3970 (a proprietary fatty acid ester). The XE929 surfactant dispersed in the LUDOX™ but did not precipitate or cause the suspension to gel.

The two components were then combined to make 10 mL of an oil external emulsion with a volumetric oil/water ratio of approximately 50/50. The oil-external nature of the emulsion was confirmed by both electrical-conductivity testing and droplet testing into DI water. The emulsion was stable for several hours at room temperature without phase separation, silica precipitation or gelation. The emulsion stability suggests that calcium hydroxide and colloidal silica are separated from each other. Presumably, this arises from the calcium hydroxide particles being held in the oil phase, separate from the colloidal silica in the water phase.

This stable emulsion was then poured into 15 grams of clean 20/40 silica sand held in a plastic sample container (50 mL total volume). The emulsion readily percolated through the sand pack. The emulsion/sand mixture was placed in a water bath for 1.5 hour at 150° F. (65° C.) to simulate downhole conditions. After 1.5 hours in the sand pack at temperature, a visible oil layer formed on top of the sand pack, indicating that the emulsion had broken either from exposure to the elevated temperature, exposure to the sand or a combination of those factors. As the emulsion broke, the colloidal silica and calcium hydroxide contacted each other and the sand-consolidation process began. After 1.5 hours at 150° F. (65° C.), sand consolidation was clearly detectable by pushing the end of a spatula against the sand pack and observing resistance. This resistance appeared to increase as the sand pack set longer at temperature, indicating that the sand bond strengthened with time at temperature.

EXAMPLE 2

In the second example, an emulsion similar to that in Example 1 was prepared, except that the calcium hydroxide concentration in the oil phase was doubled to 2 grams per 100 mL of diesel. Also, the volumetric oil/water ratio was 50/50. This emulsion was also stable by itself, and broke upon exposure to temperature and the sand pack. As with the previous example, the sand-pack strength increased over a period of a few hours at 150° F.

EXAMPLE 3

This Example involves emulsions prepared with LUDOX™-HS40, and the oil phase contained 15 wt % $Ca(OH)_2$. Four oil/water ratios were used: 30/70; 40/60; 50/50 and 60/40.

Unlike the previous examples, the emulsions in this example were injected into a sand pack. 20 g of 100-mesh sand were placed inside a 1-in. diameter by 3-in. long plastic tube. Using a syringe, 9 mL of 2% KCl were injected as a preflush to wet the sand. Then, sufficient emulsion was injected into the sand pack to displace the preflush and fill the pore volume in the sand pack. After injection, the tube was sealed and placed in a 150° F. water bath.

After injection, sand bonding was observed after about 30 minutes curing in the water bath. Compressive strength (resistance to penetration by a spatula) began to develop within 1-5 hours. After curing overnight, the tubes were removed from the water bath and the consolidated sand packs were extracted from the tubes. The sand packs were free standing.

EXAMPLE 4

This Example involved emulsions prepared with LUDOX™-HS40, and the oil phase contained 15 wt % $Ca(OH)_2$. Four oil/water ratios were used: 30/70; 40/60; 50/50 and 60/40. The sand packs were prepared by mixing the emulsions manually with clean 100-mesh sand. The mixtures were placed in a 175° F. water bath for 5 hr to simulate conditions in the near-wellbore region. After curing, the consolidated sand was trimmed into 1 in. diameter by 2 in. long cylinders for compressive-strength testing with a hydraulic press. The results are shown below in Table 1.

TABLE 1

| Oil/Water Ratio | Compressive Strength (psi) |
|---|---|
| 30/70 | 74 |
| 40/60 | 55 |
| 50/50 | 37 |
| 60/40 | 18 |

EXAMPLE 5

This Example involved emulsions prepared with LUDOX™ TM50, and the oil phase contained 15 wt % $Ca(OH)_2$. Four oil/water ratios were used: 30/70; 40/60; 50/50 and 60/40.

The emulsions were injected into a sand pack. 30 g of 100-mesh sand were placed inside a 1-in. diameter by 3-in. long plastic tube. Using a syringe, 9 mL of 2% KCl were injected as a preflush to wet the sand. Then, sufficient emulsion was injected into the sand pack to displace the preflush and fill the pore volume in the sand pack. After injection, the tube was sealed and placed in a 150° F. water bath.

After injection, sand bonding was observed after about 30 minutes curing in the water bath. Compressive strength (resistance to penetration by a spatula) began to develop within 1-5 hours. After curing overnight, the tubes were removed from the water bath and the consolidated sand packs were extracted from the tubes. The sand packs were free standing.

EXAMPLE 6

This Example involved emulsions prepared with 5 vol % Baker Petrolite® A3970 in colloidal silica sol (LUDOX® TM-50), and 5 vol % Uniquema Hypermer® 2422 in diesel containing 15 wt % calcium hydroxide. Four oil/water ratios were tested: 30/70, 40/60, 50/50 and 60/40. The sand packs were prepared by manually mixing the emulsions into clean 100-mesh silica sand, placing the mixtures in 50-mL plastic sample containers and curing them in a 175° F. water bath for 5 hr to simulate near-wellbore downhole conditions. After curing, the cores were trimmed into 1 in. diameter by 2 in. long cylinders for compressive strength testing with a hydraulic press. The results are shown below in Table 2.

TABLE 2

| Oil/Water Ratio | Compressive Strength (psi) |
|---|---|
| 30/70 | 72 |
| 40/60 | 48 |
| 50/50 | 32 |
| 60/40 | 28 |

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A sand consolidation system comprising an emulsion having an oil phase and an aqueous phase, said emulsion comprising a source of insoluble silica particles and a source of calcium hydroxide, wherein the source of calcium hydroxide is present in the oil phase, and the source of insoluble silica particles are contained in the aqueous phase.

2. A sand consolidation system according to claim 1, said emulsion having an external oil phase, and an internal aqueous phase, wherein the silica source is contained in the aqueous phase and the calcium hydroxide source is contained in the oil phase, whereby reaction of the silica with the calcium hydroxide is inhibited.

3. A sand consolidation system according to claim 1 wherein the oil to water ratio is from about 30/70 to about 60/40.

4. A sand consolidation system according to claim 1 wherein the silica and the calcium hydroxide are provided as particles having a median particle size of no more than about fifty percent of the median pore size of a typical void in the formation.

5. A formation consolidation process comprising injecting into a subterranean formation penetrated by a wellbore a pumpable system comprising an emulsion having an oil phase and an aqueous phase, wherein said emulsion comprises an insoluble silica source and a calcium hydroxide source, said insoluble silica source being present in said aqueous phase, and said calcium hydroxide source being present in said oil phase of said emulsion.

6. The process of claim 5 wherein said emulsion has an external oil phase and wherein the oil to water ratio is from about 30/70 to about 60/40.

7. The process of claim 5 wherein the wellbore is a cased borehole and said emulsion system is pumped into contact with the formation through one or more perforations in the casing.

8. The process of claim 7 wherein the source of silica is selected from the group consisting of colloidal silica, silica fume and fumed silica.

9. The process of claim 8 wherein said calcium salt is calcium chloride or calcium chloride hydrate.

10. The process of claim 5 wherein the source of calcium hydroxide is a combination of an aqueous calcium salt and an aqueous sodium hydroxide or potassium hydroxide.

11. A well treatment process comprising injecting into a gravel pack a pumpable system comprising an emulsion having an oil phase and an aqueous phase, comprising in said aqueous phase, an insoluble silica source and in said oil phase, a source of calcium hydroxide, whereby reaction of the silica with calcium hydroxide reaction is delayed.

12. The process of claim 11 wherein the source of silica is colloidal silica, fumed silica, precipitated silica, calcined clay, and fly ash.

13. The process of claim 11 wherein the source of silica is colloidal silica.

14. The process of claim 11 wherein the source of calcium hydroxide is a combination of an aqueous calcium salt and an aqueous sodium hydroxide or potassium hydroxide.

15. The process of claim 11 wherein the silica and the calcium hydroxide are provided as particles having a median particle size of no more than about fifty percent of the median pore size of a typical void in the formation.

16. A sand consolidation system comprising an emulsion having an oil phase and an aqueous phase, said emulsion comprising a source of insoluble silica particles reactive with calcium hydroxide, wherein the source of insoluble silica particles is contained in the aqueous phase, said emulsion further comprising a source of calcium hydroxide, wherein the source of calcium hydroxide is present in the oil phase.

17. A sand consolidation system according to claim 16 wherein the molar ratio of calcium hydroxide to reactive silica is from about 0.8 to about 2.5.

18. A sand consolidation system comprising an emulsion having an oil phase and an aqueous phase, said emulsion comprising insoluble pozzolan particles and a source of calcium hydroxide, wherein the source of calcium hydroxide is present in the oil phase, and the source of insoluble pozzolan particles are contained in the aqueous phase.

19. A sand consolidation system according to claim 18 wherein the silica is selected from fumed silica, precipitated silica, colloidal silica, calcined clay, and fly ash.

20. A formation consolidation process comprising injecting into a subterranean formation penetrated by a wellbore a pumpable system comprising an emulsion having an oil phase and an aqueous phase, wherein said emulsion comprises an insoluble silica source and a calcium hydroxide source, wherein said insoluble silica source is present in said aqueous phase, and wherein said calcium hydroxide source is present in said oil phase of said emulsion, whereby reaction of the silica with calcium hydroxide is delayed.

21. A formation consolidation process comprising injecting into a subterranean formation penetrated by a wellbore a pumpable system comprising an emulsion having an oil phase and an aqueous phase, wherein said emulsion comprises an insoluble pozzolan and a calcium hydroxide source, said insoluble pozzolan being present in said aqueous phase, and said calcium hydroxide source being present in said oil phase of said emulsion.

22. The process of claim 21 wherein the pozzolan is colloidal silica.

23. The process of claim 21 wherein the pozzolan is selected from the group consisting of colloidal silica, fumed silica, precipitated silica, calcined clay, and fly ash.

24. The process of claim 21 wherein the pozzolan and the calcium hydroxide are provided as particles having a median particle size of no more than about fifty percent of the median pore size of a typical void in the formation.

25. The process of claim 21 wherein the components of said emulsion consolidation system are blended prior to the treatment.

26. A consolidated formation produced by the process of claim 21.

27. The process of claim 21 wherein the consolidated formation is subsequently hydraulically fractured.

* * * * *